US012400808B2

(12) United States Patent
Martirano

(10) Patent No.: US 12,400,808 B2
(45) Date of Patent: Aug. 26, 2025

(54) MECHATRONIC CONTROL DEVICE

(71) Applicant: UNIVERSITA' DEGLI STUDI DI ROMA "LA SAPIENZA", Rome (IT)

(72) Inventor: Luigi Martirano, Rome (IT)

(73) Assignee: UNIVERSITÀ DEGLI STUDI DI ROMA "LA SAPIENZA", Rome (IT)

( * ) Notice: Subject to any disclaimer, the term of this patent is extended or adjusted under 35 U.S.C. 154(b) by 73 days.

(21) Appl. No.: 18/289,549

(22) PCT Filed: May 9, 2022

(86) PCT No.: PCT/IB2022/054264
§ 371 (c)(1),
(2) Date: Nov. 3, 2023

(87) PCT Pub. No.: WO2022/238856
PCT Pub. Date: Nov. 17, 2022

(65) Prior Publication Data

US 2024/0249894 A1 Jul. 25, 2024

(30) Foreign Application Priority Data

May 10, 2021 (IT) ........................ 102021000011870

(51) Int. Cl.
*H01H 9/00* (2006.01)

(52) U.S. Cl.
CPC ................................. *H01H 9/0066* (2013.01)

(58) Field of Classification Search
CPC .. H01H 9/0066; H01H 9/0228; H01H 47/001; H01H 2300/03; H01H 2300/038
See application file for complete search history.

(56) References Cited

U.S. PATENT DOCUMENTS 3,864,535 A * 2/1975 Richards .................. H01H 9/00 200/337
5,132,865 A * 7/1992 Mertz .................. H01H 71/123 361/114
5,180,051 A * 1/1993 Cook ..................... H01H 89/08 335/14
(Continued)

FOREIGN PATENT DOCUMENTS

BR 112014033020 A2 * 6/2017 ........... H01H 1/0015
BR PI0210117 B1 * 11/2020 ......... H01H 33/6662
(Continued)

OTHER PUBLICATIONS

International Search Report and Written Opinion of PCT/IB2022/054264, dated Sep. 23, 2022.

*Primary Examiner* — Berhanu Tadese
(74) *Attorney, Agent, or Firm* — Troutman Pepper Locke LLP

(57) ABSTRACT

An electronic electrical device comprising a first electrical conductor for the input of electric current, a second electrical conductor for the output of electric current, first and second electrical control devices, and first and second actuation systems. The first electrical control device and the second electrical control device are each adapted to have two respective positions to electrically connect and disconnect the first electrical conductor and the second electrical conductor to and from each other. The first actuation system comprising a digital electronic controller and the second actuation system comprising only mechanical components, or electromechanical components, or mechanical and electromechanical components. The first actuation system is adapted to vary the position of said first electrical control device independently of said second actuation system. The second actuation means is adapted to vary the position of said second electrical control device independently of said first actuation system.

14 Claims, 8 Drawing Sheets

(56) References Cited

U.S. PATENT DOCUMENTS

| | | | | | |
|---|---|---|---|---|---|
| 5,408,208 | A * | 4/1995 | DiMarco | H01H 83/20 335/14 |
| 6,701,236 | B2 * | 3/2004 | Ulyanov | B60G 17/0182 703/2 |
| 6,810,594 | B2 * | 11/2004 | Lucarini | G01C 1/00 33/270 |
| 7,161,276 | B2 * | 1/2007 | Face | H01H 13/7006 310/314 |
| 8,848,333 | B2 * | 9/2014 | Nestler | H01H 71/08 361/115 |
| 9,791,017 | B2 * | 10/2017 | Carcaterra | F16F 9/532 |
| 10,638,997 | B2 * | 5/2020 | Pani | A61B 8/463 |
| 10,707,031 | B2 * | 7/2020 | Da Mota Pais | H01H 9/167 |
| 11,264,191 | B2 * | 3/2022 | Tanigaki | H01H 33/42 |
| 11,314,211 | B2 * | 4/2022 | Vau | G05B 13/047 |
| 11,342,151 | B2 * | 5/2022 | Telefus | H02M 1/08 |
| 11,373,831 | B2 * | 6/2022 | Telefus | H01H 9/56 |
| 11,551,899 | B2 * | 1/2023 | Telefus | H01H 9/56 |
| 11,657,993 | B2 * | 5/2023 | Gottschalk | H01H 50/02 335/168 |
| 12,015,261 | B2 * | 6/2024 | Telefus | H02M 1/083 |
| 2004/0024750 | A1 * | 2/2004 | Ulyanov | G06N 10/60 |
| 2005/0168108 | A1 * | 8/2005 | Face | H01H 13/7006 310/330 |
| 2007/0029174 | A1 * | 2/2007 | Niesing | G01D 5/18 200/1 R |
| 2016/0300670 | A1 * | 10/2016 | Ataka | H01H 13/803 |
| 2016/0348749 | A1 * | 12/2016 | Carcaterra | F16F 15/022 |
| 2017/0079609 | A1 * | 3/2017 | Pani | A61B 8/463 |
| 2024/0249894 | A1 * | 7/2024 | Martirano | H01H 9/0066 |

FOREIGN PATENT DOCUMENTS

| | | | | | |
|---|---|---|---|---|---|
| CA | 2024645 | A1 * | 3/1991 | H01H 9/26 |
| CA | 2514685 | A1 * | 2/2006 | H01H 89/06 |
| CN | 1258798 | C * | 6/2006 | H01H 89/08 |
| CN | 106298388 | A * | 1/2017 | H01H 71/0228 |
| CN | 119093267 | A * | 12/2024 | H03K 17/90 |
| DE | 102015225243 | A1 * | 12/2016 | H01H 71/0228 |
| DK | 1221171 | T3 * | 10/2003 | H01H 89/08 |
| EP | 0535844 | A1 * | 4/1993 | H01H 71/04 |
| EP | 0764961 | A1 * | 3/1997 | H01H 73/14 |
| EP | 0535844 | B1 * | 6/1997 | H01H 89/06 |
| FR | 2651915 | A1 * | 3/1991 | H01H 71/123 |
| GB | 2134729 | B * | 4/1986 | H05B 1/0266 |
| GB | 2125627 | B * | 7/1986 | H01H 1/22 |
| GB | 2275132 | B * | 8/1996 | H01H 19/605 |
| GB | 2517368 | B * | 6/2020 | H01H 47/001 |
| IT | 202100011870 | A1 * | 11/2022 | H01H 9/0066 |
| JP | S54125483 | A * | 9/1979 | H01H 1/16 |
| KR | 20180044805 | A * | 5/2018 | H01H 13/28 |
| KR | 20220038599 | A * | 3/2022 | H02H 3/023 |
| PL | 1776710 | T3 * | 7/2008 | H01H 71/04 |
| PL | 2639806 | T3 * | 10/2017 | H01H 25/065 |
| WO | WO-9300693 | A1 * | 1/1993 | H01H 89/08 |
| WO | WO-2005041464 | A2 * | 5/2005 | H01H 13/7006 |
| WO | 2017203410 | A1 | 11/2017 | |
| WO | WO-2015173841 | A9 * | 2/2018 | A61B 6/5247 |
| WO | WO-2019239590 | A1 * | 12/2019 | H01H 71/46 |
| WO | 2020261201 | A1 | 12/2020 | |
| WO | WO-2020264201 | A1 * | 12/2020 | A61P 25/20 |
| WO | WO-2022238856 | A1 * | 11/2022 | H01H 47/001 |

* cited by examiner

MECHATRONIC CONTROL DEVICE

This application is a national stage application under 35 U.S.C. § 371 of PCT Application No. PCT/IB2022/054264, filed 9 May 2022, which claims the priority benefit of Italian Patent Application No. 102021000011870, filed on 10 May 2021, each of which is incorporated by reference herein in its entirety.

FIELD OF THE INVENTION

The present invention relates to the field of electronic electrical control devices, for example with the function of switch or diverter.

More specifically, the invention relates to the sector of smart electronic electrical devices, i.e., operated by means of digital electronic means adapted to communicate with a remote electronic control system.

PRIOR ART

The control switches currently on the market may be classified into three distinct families:

- conventional type, only manual switches with a mechanical element that acts on the electrical contact for exclusive use in conventional systems with direct control on the power circuit;
- electromechanical type only, operated by means of an auxiliary control circuit by means of a magnetic coil for use in control systems with electromechanical relays/contactors;
- digital electronic type, operated by means of a digital communication system, in particular adapted to communicate with a remote electronic control system.

If a switch of the digital electronic type is adopted, the issue of the reliability of the electronic part and the communication part arises. Furthermore, there is a second issue of impossibility of acting on the control itself in a mechanical manner, except by means of control systems that block the possibility of subsequently sending the command back by means of the electronics. Such issue occurs, in particular, when upgrading existing systems with the adoption of digital electronic solutions.

The prior art does not include the possibility of mechanically acting on the device without forcing the electronic part. There are no devices that combine the two modes (mechanical and electronic) in an undifferentiated manner. Currently known devices provided with a manual control act as a forcing with respect to the digital electronic control, or smart control. Known smart controls, in the event of a failure or lack of connectivity, are inhibited and therefore the user has difficulty or is unable to control the electrical load.

Therefore, the need is felt to overcome the limits of the prior art.

In particular, the need is felt for a device offering a greater versatility of use.

SUMMARY OF THE INVENTION

It is an object of the present invention to produce an electronic electrical control device that is more versatile with respect to the prior art.

In particular, it is an object of the present invention to provide an electronic electrical control device that may be operated even when the electronic part may not be controlled.

The present invention achieves at least one of such objects and other objects that will become apparent in light of the present description, by means of an electronic electrical device comprising

- a first electrical conductor for the input of electric current;
- a second electrical conductor for the output of electric current;
- a first electrical control device adapted to have two positions to electrically connect and disconnect the first electrical conductor and the second electrical conductor to/from each other;
- a second electrical control device adapted to have two positions to electrically connect and disconnect the first electrical conductor and the second electrical conductor to/from each other;
- first actuation means comprising a digital electronic controller;
- second actuation means comprising only mechanical and/or electromechanical components;
- wherein the first actuation means are adapted to vary the position of said first electrical control device independently of said second actuation means;
- and wherein the second actuation means are adapted to vary the position of said second electrical control device independently of said first actuation means.

The invention also relates to an electrical socket, in particular a controlled electrical socket, according to claim 14.

Advantageously, the electronic electrical device may be controlled, or operated, both by means of the first actuation means and by means of the second actuation means.

Advantageously, therefore, in the event of failure of the first actuation means, for example, in the event of failure of the digital electronic controller, or in case of lack of connection with the communication network, or in the absence of the communication system, the electronic electrical device may be controlled by means of the second actuation means.

In fact, advantageously, the second actuation means comprise only mechanical and/or electromechanical components, and in particular they are not controlled by any electronic component.

Advantageously, the first actuation means and the second actuation means may be operated indifferently, without one excluding the other.

Furthermore, the electronic electrical device offers the possibility of being controlled exclusively by means of the first actuation means or exclusively by means of the second actuation means.

Advantageously, the second actuation means are redundant with respect to the first actuation means.

The electronic electrical device may be of the unipolar type or of the multipolar type.

By way of example and not by way of limitation, the electronic electrical device may function as: a compact cable control switch (for example, as a switch for a table lamp); a socket control switch to be placed in conventional and standardized sockets; a DIN rail control switch, to be placed on electrical switchboards; a control switch integrated into a smart socket which may be controlled with a manual control switch.

Exclusively by way of example, the electronic part of the electronic electrical device may be electrically powered by: 230 V mains voltage, in particular in the case where a phase-neutral bipolar connection is provided; or the voltage of a control BUS, in particular when a connection to a wired BUS system is provided; or by means of an internal battery.

The electronic electrical device is particularly suitable both for applications in the home automation sector as well as in the industrial sector.

The electronic electrical device may be used both in a newly built system as well as in the upgrading of systems, while maintaining the existing wiring so as to digitize the controls while maintaining the existing control points.

Further features and advantages of the invention will become more apparent in the light of the detailed description of exemplary but not exclusive embodiments.

The dependent claims describe particular embodiments of the invention.

BRIEF DESCRIPTION OF THE FIGURES

In the description of the invention, reference is made to the accompanying drawings, which are provided by way of non-limiting example, in which.

The same elements, or functionally equivalent elements, have the same reference numeral.

DESCRIPTION OF EXEMPLARY EMBODIMENTS OF THE INVENTION

Figure 1:
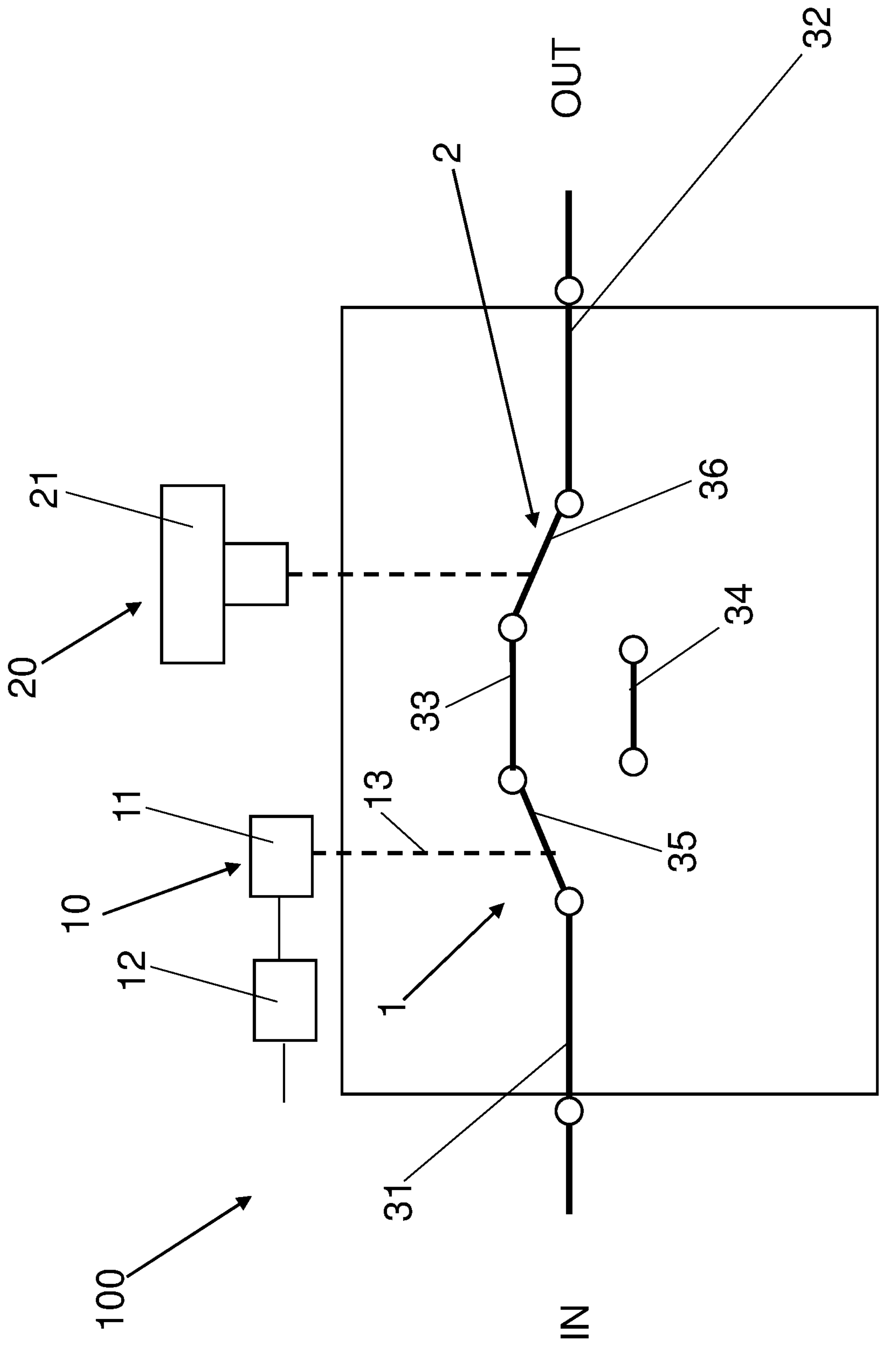
FIG. 1 diagrammatically shows an example of the device according to the invention, in a first configuration.

With reference to the Figures, exemplary and non-limiting embodiments of an electronic electrical device 100, 100', or control device or mechatronic control device, according to the invention, are described.

In all the embodiments, the electronic electrical device 100, 100' comprises

- a first electrical conductor 31 for the input of electric current;
- a second electrical conductor 32 for the output of electric current;
- a first electrical control device 1 adapted to have two positions to electrically connect and disconnect the first electrical conductor 31 and the second electrical conductor 32 to/from each other;
- a second electrical control device 2, 2' adapted to have two positions to electrically connect and disconnect the first electrical conductor 31 and the second electrical conductor 32 to/from each other;
- first actuation means 10 comprising a digital electronic controller 11;
- second actuation means 20 comprising only mechanical and/or electromechanical components;
- wherein the first actuation means 10 are adapted to vary the position of said first electrical control device 1 independently of said second actuation means 20;
- and wherein the second actuation means 20 are adapted to vary the position of said second electrical control device 2, 2' independently of said first actuation means 10.

In particular, the first actuation means 10 and the second actuation means 20 are distinct from each other.

The first actuation means 10 are, preferably, adapted to vary the position only of said first electrical control device 1.

The second actuation means 20 are, preferably, adapted to vary the position only of said second electrical control device 2, 2'.

In an example (FIG. 1-4), the second electrical control device 2 is an electric diverter; and the electronic electrical device 100 is configured to function as an electrical switch.

In particular, advantageously, the electronic electrical device 100, depending on the position of the first electrical control device 1 and of the second electrical control device 2, may have two distinct configurations in which the electronic electrical device 100 functions as a closed switch, and two distinct configurations in which the electronic electrical device 100 functions as an open switch.

In another example (FIG. 5-8), said second electrical control device 2' is an electric inverter; and the electronic electrical device 100' is configured to function as an electric diverter.

Figure 6:
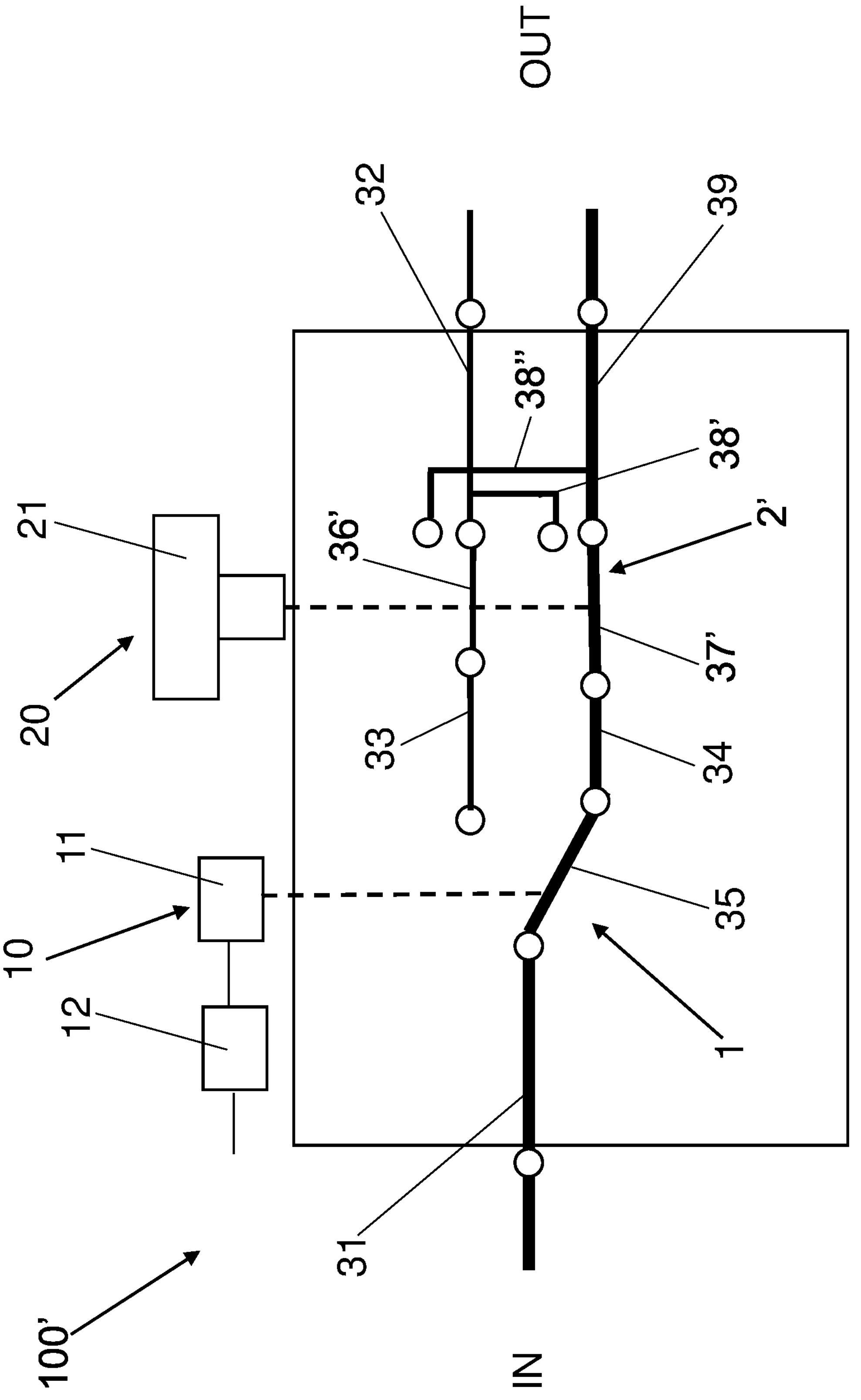
FIG. 6 diagrammatically shows the device of FIG. 5, in a second configuration.
Figure 7:
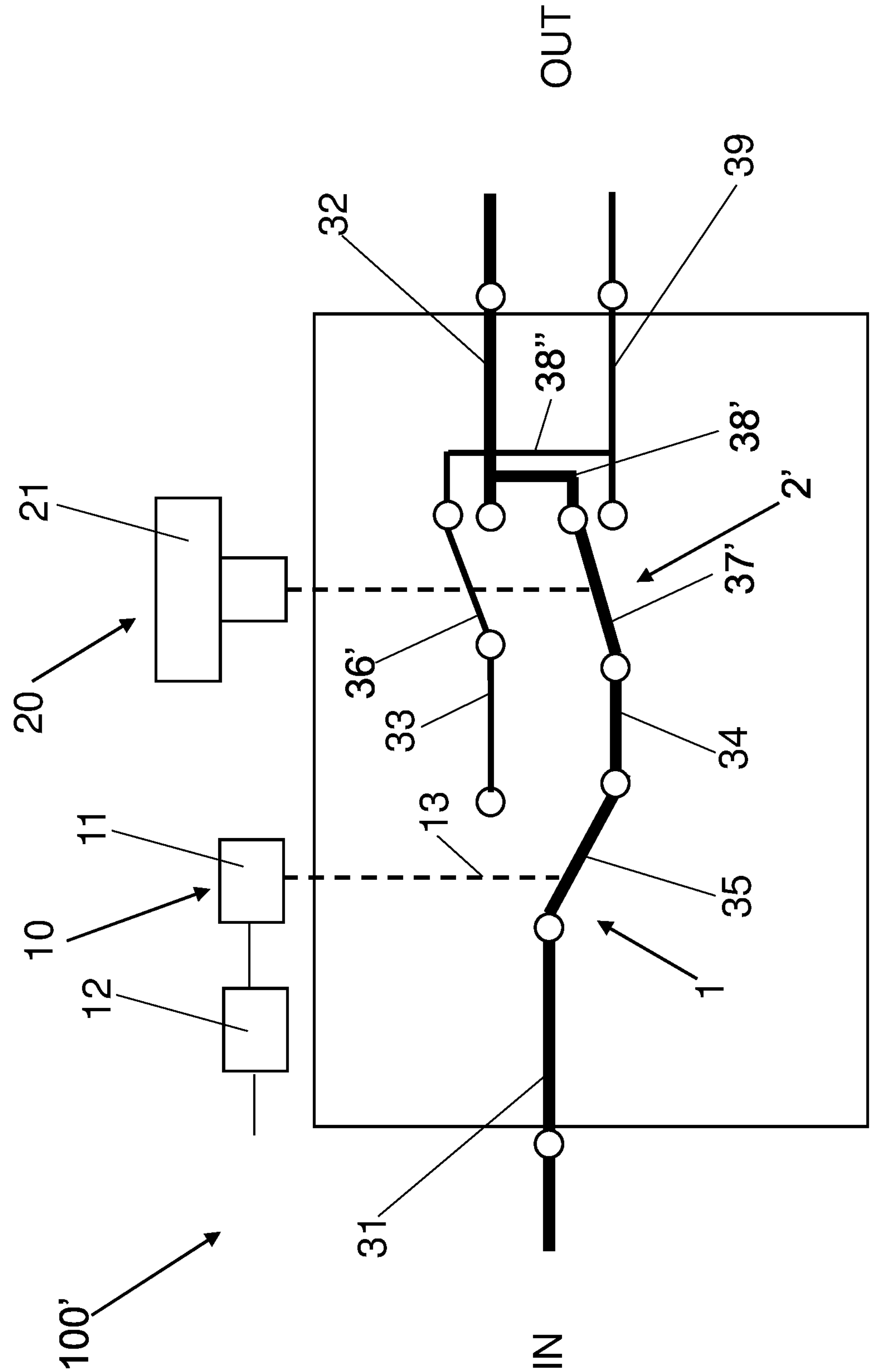
FIG. 7 diagrammatically shows the device of FIG. 5, in a third configuration.
Figure 8:
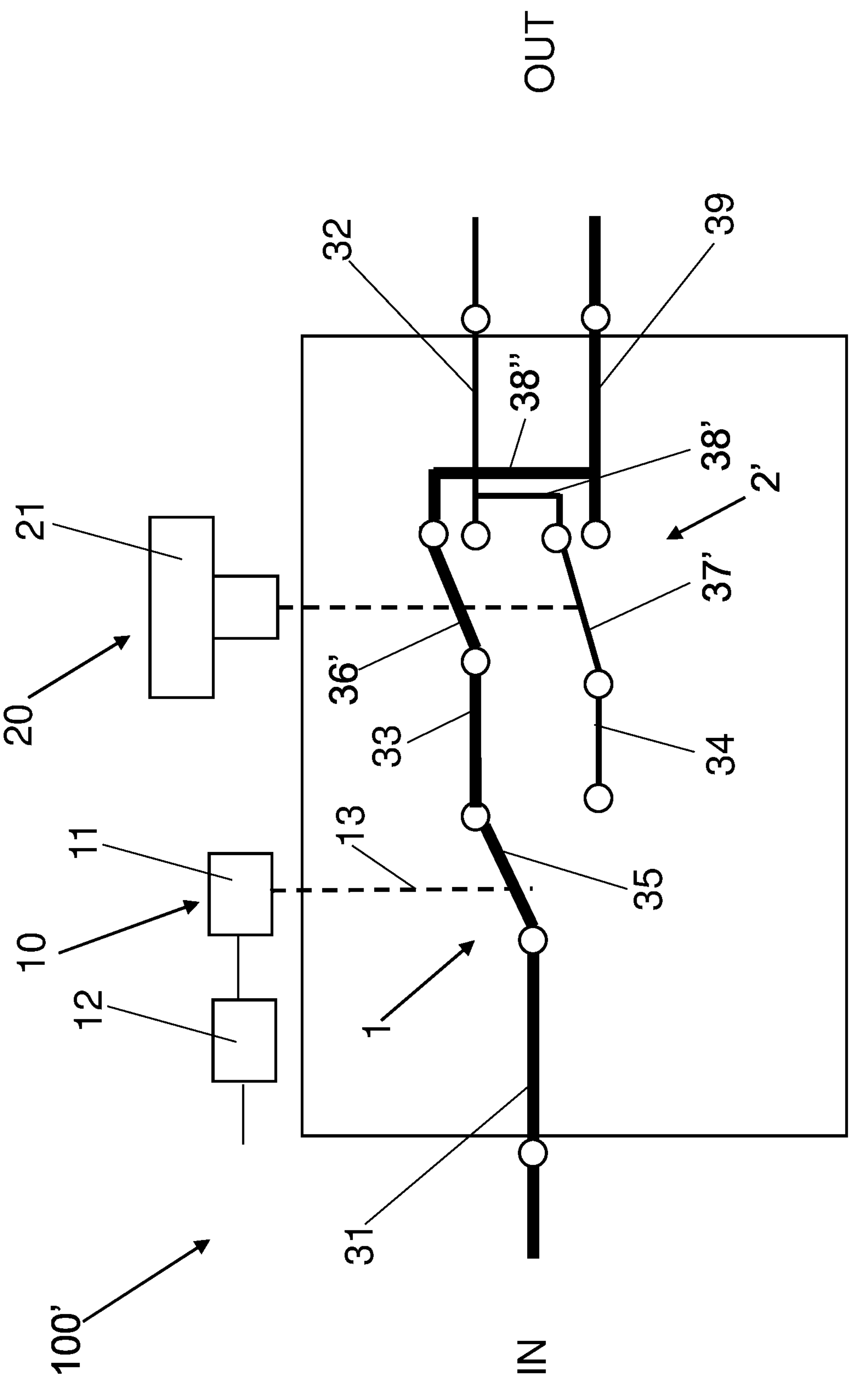
FIG. 8 diagrammatically shows the device of FIG. 5, in a fourth configuration.

In particular, the electronic electrical device 100' comprises a further electrical conductor 39 for the output of electric current;

and the electronic electrical device 100' is configured so that, depending on the position taken by the first electrical control device 1 and by the second electrical control device 2' (i.e., by the electric inverter), the first electrical conductor 31 is electrically connected to the second electrical conductor 32 and electrically disconnected from said further electrical conductor 39 (FIG. 5 and FIG. 7), or the first electrical conductor 31 is electrically connected to said further electrical conductor 39 and electrically disconnected from said second electrical conductor 32 (FIG. 6 and FIG. 8).

In particular, advantageously, the electronic electrical device 100', depending on the position of the first electrical control device 1 and of the second electrical control device 2', may have two distinct configurations in which the first electrical conductor 31 is electrically connected to the second electrical conductor 32 and electrically disconnected from said further electrical conductor 39, and two distinct configurations in which the first electrical conductor 31 is electrically connected to said further electrical conductor 39 and electrically disconnected from said second electrical conductor 32.

In all the embodiments, preferably, the electronic electrical device 100, 100' comprises a third electrical conductor 33 and a fourth electrical conductor 34.

Furthermore, said first electrical control device 1 comprises a fifth electrical conductor 35 electrically connected to the first electrical conductor 31.

In a first position of the first electrical control device 1 the fifth electrical conductor 35 is electrically connected to the third electrical conductor 33 and electrically disconnected from the fourth electrical conductor 34 (FIG. 1, FIG. 4, FIG. 5, FIG. 8);

and in a second position of the first electrical control device 1, the fifth electrical conductor 35 is electrically connected to the fourth electrical conductor 34 and electrically disconnected from the third electrical conductor 33 (FIG. 2, FIG. 3, FIG. 6, FIG. 7).

In the example shown in FIGS. 1-4, the second electrical control device 2 comprises a sixth electrical conductor 36 electrically connected to the second electrical conductor 32.

Figure 2:
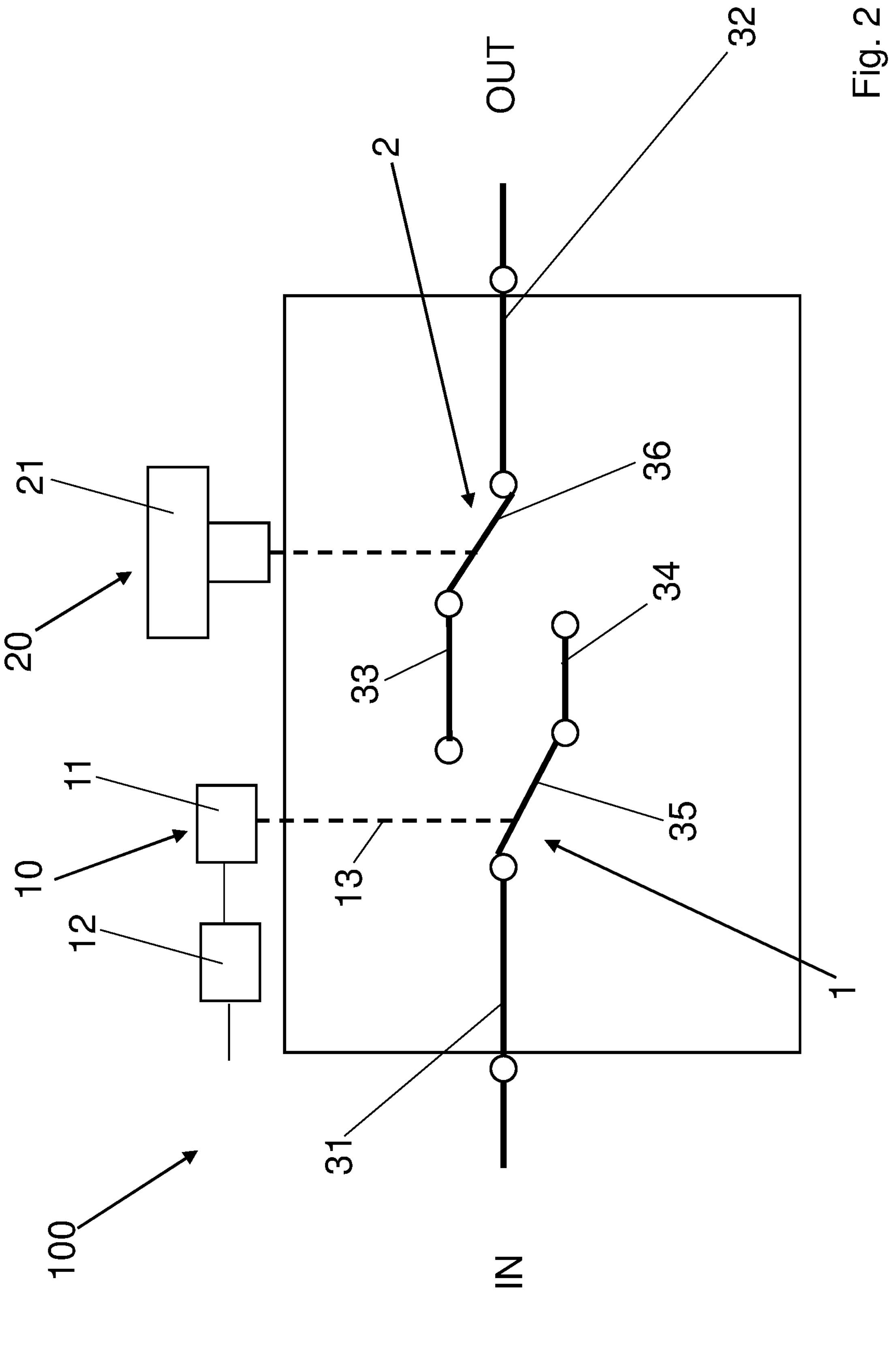
FIG. 2 diagrammatically shows the device of FIG. 1, in a second configuration.
Figure 3:
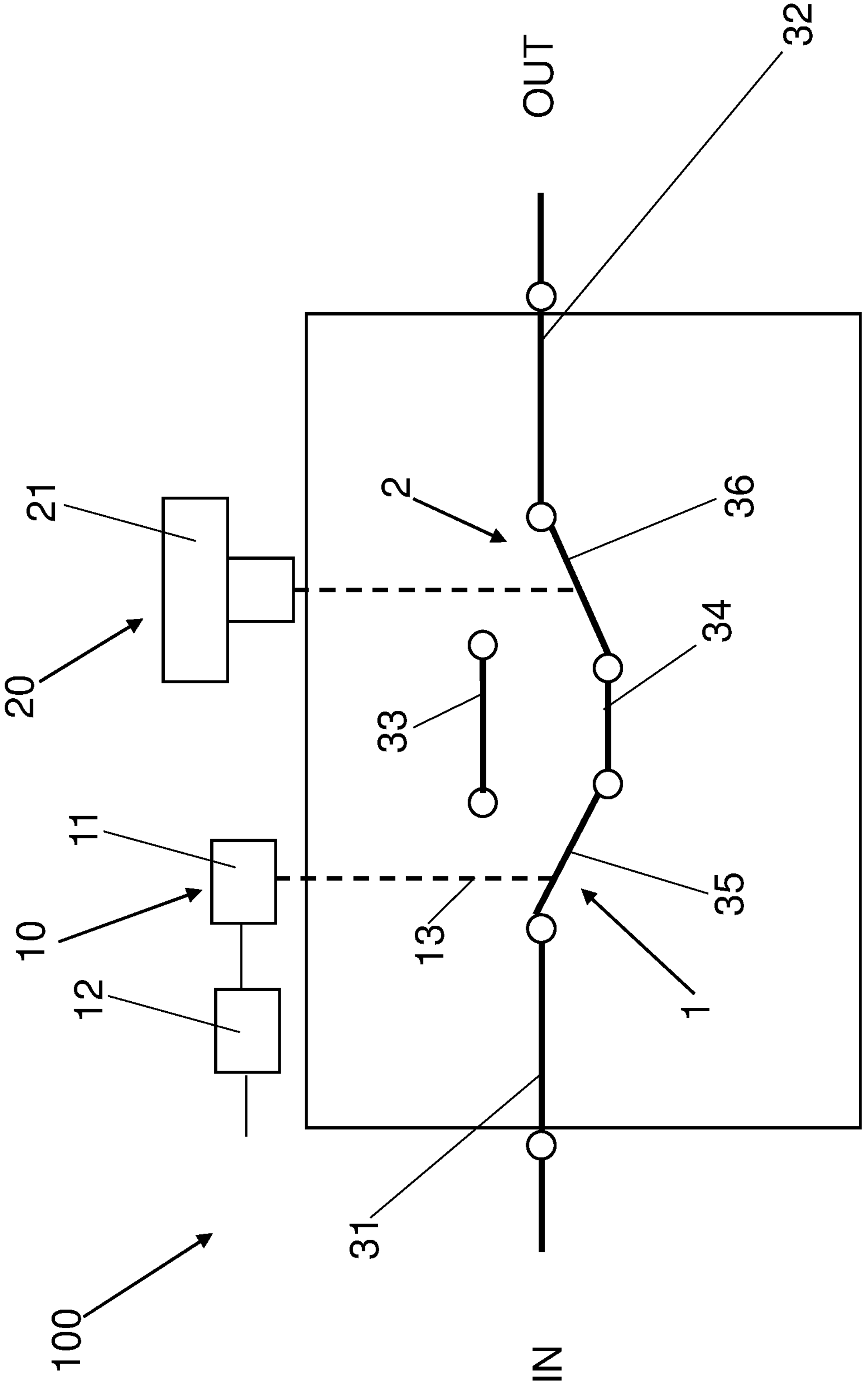
FIG. 3 diagrammatically shows the device of FIG. 1, in a third configuration.
Figure 4:
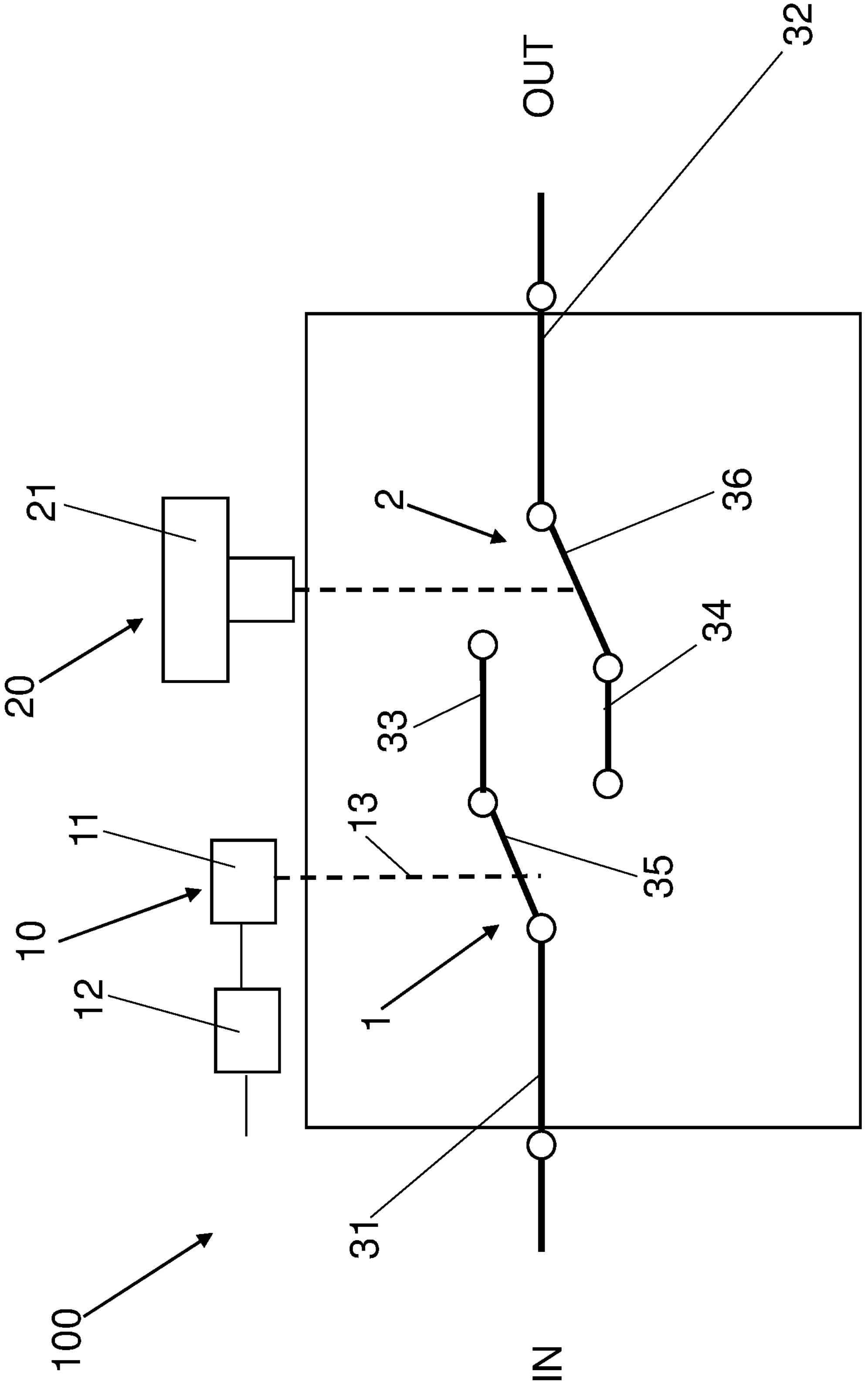
FIG. 4 diagrammatically shows the device of FIG. 1 in a fourth configuration.
Figure 5:
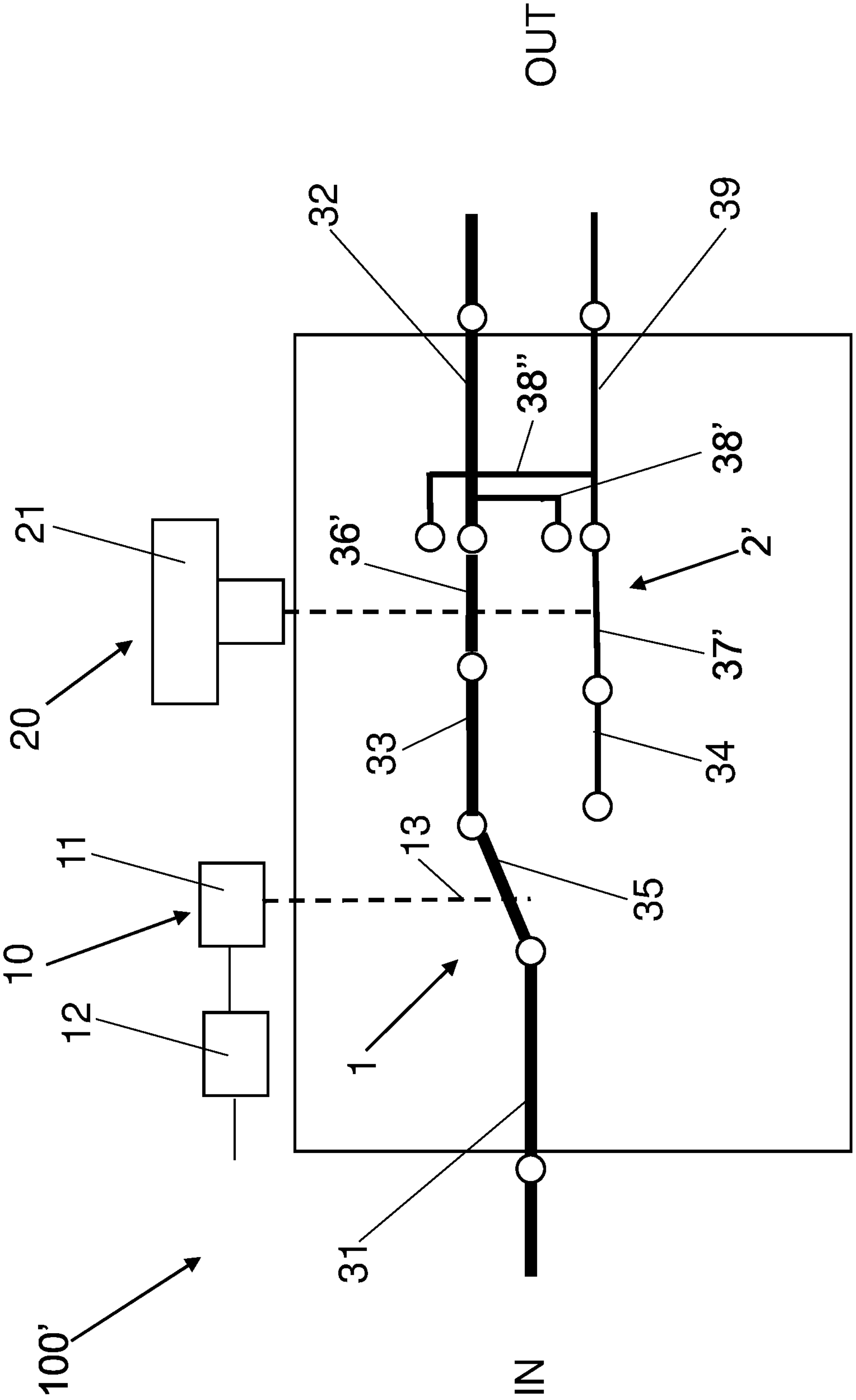
FIG. 5 diagrammatically shows another example of the device according to the invention, in a first configuration.

Furthermore, in a first position of the second electrical control device 2 the sixth electrical conductor 36 is electrically connected to the third electrical conductor 33 and electrically disconnected from the fourth electrical conductor 34 (FIG. 1, FIG. 2);

and in a second position of the second electrical control device 2 the sixth electrical conductor 36 is electrically connected to the fourth electrical conductor 34 and electrically disconnected from the third electrical conductor 33 (FIG. 3, FIG. 4).

Therefore, when the first electrical control device 1 is in the first position and the second electrical control device 2 is in the first position, the first electrical conductor 31 and the second electrical conductor 32 are electrically connected to each other (FIG. 1).

When the first electrical control device 1 is in the second position and the second electrical control device 2 is in the first position, the first electrical conductor 31 and the second electrical conductor 32 are electrically disconnected from each other (FIG. 2).

When the first electrical control device 1 is in the second position and the second electrical control device 2 is in the second position, the first electrical conductor 31 and the second electrical conductor 32 are electrically connected to each other (FIG. 3).

When the first electrical control device 1 is in the first position and the second electrical control device 2 is in the second position, the first electrical conductor 31 and the second electrical conductor 32 are electrically disconnected from each other (FIG. 4).

Advantageously, the fifth electrical conductor 35 may be moved by the first actuation means 10 to be alternatively connected to the electrical conductor 33 or to the electrical conductor 34, independently of the second actuation means 20.

Advantageously, furthermore, the sixth electrical conductor 36 may be moved by the second actuation means 20 to be alternatively connected to the electrical conductor 33 or to the electrical conductor 34, independently of the first actuation means 10.

In the example shown in FIGS. 5-8, the second electrical control device 2' comprises a sixth electrical conductor 36' electrically connected to the third electrical conductor 33.

Furthermore, the second electrical control device 2' comprises a seventh electrical conductor 37' electrically connected to the fourth electrical conductor 34.

In a first position of the second electrical control device 2' (FIG. 5 and FIG. 7), the sixth electrical conductor 36' is electrically connected to the second electrical conductor 32 and electrically disconnected from said further electrical conductor 39, and the seventh electrical conductor 37' is electrically connected to said further electrical conductor 39 and electrically disconnected from said second electrical conductor 32.

In a second position of the second electrical control device 2' (FIG. 6 and FIG. 8), the sixth electrical conductor 36' is electrically connected to said further electrical conductor 39 and electrically disconnected from said second electrical conductor 32, and the seventh electrical conductor 37' is electrically connected to said second electrical conductor 32 and electrically disconnected from said further electrical conductor 39.

The sixth electrical conductor 36' and the seventh electrical conductor 37' always move together.

An electrical conductor 38' and an electrical conductor 38" are also preferably provided.

The electrical conductor 38' is electrically connected to the electrical conductor 32, in particular it branches off from the electrical conductor 32.

The electrical conductor 38" is electrically connected to the electrical conductor 39, in particular it branches off from the electrical conductor 39.

The electrical conductor 36' may be connected, alternatively, to a terminal of the electrical conductor 32 or to a terminal of the electrical conductor 38".

The electrical conductor 37' may be connected, alternatively, to a terminal of the electrical conductor 39 or to a terminal of the electrical conductor 38'.

Advantageously, the electrical conductors 36', 37' may be moved by the second actuation means 20 independently of the first actuation means 10.

In all the embodiments, said first electrical control device 1 is preferably an electric diverter.

In all the embodiments, preferably said first actuation means 10 comprise one or more mechanical and/or electromagnetic components 13, controlled by said digital electronic controller 11, connected to said first electrical control device 1, in particular to the electrical conductor 35, to vary the position thereof; or said digital electronic controller 11 is configured to function as a digital electric diverter.

In all embodiments, preferably the electronic electrical device 100, 100' comprises a communication module 12 connected to said digital electronic controller 11.

The communication module 12 is configured to communicate with a remote electronic control system (not shown), in particular in a wired manner and/or is configured to communicate with said remote electronic control system by means of Wi-Fi. In particular, the communication module 12 is configured to communicate with said remote electronic control system to receive a digital signal for changing the position of said first electrical control device 1. The remote electronic control system may be, exclusively by way of explanation and not by way of limitation, a computer, such as a tablet or a smartphone.

The communication module 12 may be, for example, a BUS coupling unit.

By way of example and not by way of limitation, the digital electronic controller 11 may communicate with said remote electronic control system by means of one or more of the following standards: the wired Konnex standard, the wired DALI standard, the Zig-Bee Wi-Fi standard, the Z-Wave Wi-Fi standard; a proprietary communication protocol.

In all the embodiments, preferably, said second actuation means 20 comprise a button 21 or a lever, which may be manually operated by a user, and/or an electromagnet.

The button or lever is connected, in particular mechanically, to the second electrical control device 2, 2', in particular to the electrical conductor 36 (FIG. 1-4) and to the electrical conductors 36', 37' (FIG. 5-8).

In particular, a pressure of the button, or a movement of the lever, causes the movement of the electrical conductor 36.

A pressing of the button, or a movement of the lever, causes the movement of both electrical conductors 36', 37'.

When an electromagnet is provided, the latter is adapted to move a moving part, and the electromagnet may be operated by means of an auxiliary electrical circuit external to the electronic electrical device 100, 100'.

The electronic electrical device 100, 100' may, for example, be configured to connect two portions of the electric power supply circuit to each other, in particular, to function as an electrical control switch.

The electronic electrical device 100, 100' may also be configured to function as an electric control diverter in circuits having multiple control points.

For example, the electronic electrical device 100, 100' may be configured to be arranged in a socket box or in a DIN rail.

The invention also relates to an electrical socket comprising an electronic electrical device 100, 100'.

The invention claimed is:

1. An electronic electrical device, comprising a first electrical conductor for the input of electric current;

a second electrical conductor for the output of electric current;

a first electrical control device adapted to have two positions to electrically connect and disconnect the first electrical conductor and the second electrical conductor to and from each other;

a second electrical control device adapted to have two positions to electrically connect and disconnect the first electrical conductor and the second electrical conductor to and from each other;

first actuation system comprising a digital electronic controller;

second actuation system comprising only mechanical components, or electromechanical components, or mechanical and electromechanical components;

wherein the first actuation system is adapted to vary the position of said first electrical control device independently of said second actuation system;

and wherein the second actuation system is adapted to vary the position of said second electrical control device independently of said first actuation system.

2. The electronic electrical device according to claim 1, wherein said second electrical control device is an electric diverter; and wherein the electronic electrical device is configured to function as an electrical switch.

3. The electronic electrical device according to claim 1, wherein said second electrical control device is an electric inverter; and wherein the electronic electrical device is configured to function as an electric diverter.

4. The electronic electrical device according to claim 3, comprising a further electrical conductor for the output of electric current;

wherein the electronic electrical device is configured so that, depending on the position taken by the first electrical control device and by the second electrical control device, the first electrical conductor is electrically connected to the second electrical conductor and electrically disconnected from said further electrical conductor, or the first electrical conductor is electrically connected to said further electrical conductor and electrically disconnected from said second electrical conductor.

5. The electronic electrical device according to claim 1, comprising a third electrical conductor;

a fourth electrical conductor;

wherein said first electrical control device comprises a fifth electrical conductor electrically connected to the first electrical conductor;

wherein in a first position of the first electrical control device the fifth electrical conductor is electrically connected to the third electrical conductor and electrically disconnected from the fourth electrical conductor;

wherein in a second position of the first electrical control device the fifth electrical conductor is electrically connected to the fourth electrical conductor and electrically disconnected from the third electrical conductor.

6. The electronic electrical device according to claim 5, wherein said second electrical control device is an electric diverter;

wherein the electronic electrical device is configured to function as an electrical switch;

wherein the second electrical control device comprises a sixth electrical conductor electrically connected to the second electrical conductor;

wherein in a first position of the second electrical control device the sixth electrical conductor is electrically connected to the third electrical conductor and electrically disconnected from the fourth electrical conductor;

wherein in a second position of the second electrical control device the sixth electrical conductor is electrically connected to the fourth electrical conductor and electrically disconnected from the third electrical conductor.

7. The electronic electrical device according to claim 5, wherein said second electrical control device is an electric inverter;

wherein the electronic electrical device is configured to function as an electric diverter;

wherein the electronic electrical device comprising a further electrical conductor for the output of electric current;

wherein the electronic electrical device is configured so that, depending on the position taken by the first electrical control device and by the second electrical control device, the first electrical conductor is electrically connected to the second electrical conductor and electrically disconnected from said further electrical conductor, or the first electrical conductor is electrically connected to said further electrical conductor and electrically disconnected from said second electrical conductor;

wherein the second electrical control device comprises a sixth electrical conductor electrically connected to the third electrical conductor;

wherein the second electrical control device comprises a seventh electrical conductor electrically connected to the fourth electrical conductor;

wherein in a first position of the second electrical control device, the sixth electrical conductor is electrically connected to the second electrical conductor and electrically disconnected from said further electrical conductor, and the seventh electrical conductor is electrically connected to said further electrical conductor and electrically disconnected from said second electrical conductor;

wherein in a second position of the second electrical control device, the sixth electrical conductor is electrically connected to said further electrical conductor and electrically disconnected from said second electrical conductor, and the seventh electrical conductor is electrically connected to said second electrical conductor and electrically disconnected from said further electrical conductor.

8. The electronic electrical device according to claim 1, wherein said first electrical control device is an electric diverter.

9. The electronic electrical device according to claim 1, wherein said first actuation system comprise one or more mechanical or electromagnetic components, controlled by said digital electronic controller, connected to said first electrical control device to vary the position thereof; or wherein said digital electronic controller is configured to function as a digital electric diverter.

10. The electronic electrical device according to claim 1, comprising a communication module connected to said digital electronic controller.

11. The electronic electrical device according to claim 1, wherein said second actuation system comprise a button or a lever, manually operable by a user, or an electromagnet.

12. The electronic electrical device according to claim 1, configured to connect two portions of an electric power supply circuit to each other.

13. The electronic electrical device according to claim 1, configured to be arranged in a socket box.

14. An electrical socket comprising an electronic electrical device according to claim 1.

* * * * *